Oct. 2, 1962   J. F. FRIDDELL   3,056,393
SAFETY SHUTDOWN APPARATUS
Filed Dec. 5, 1961
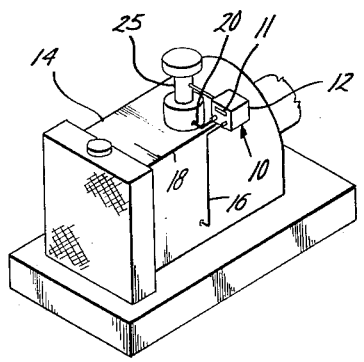
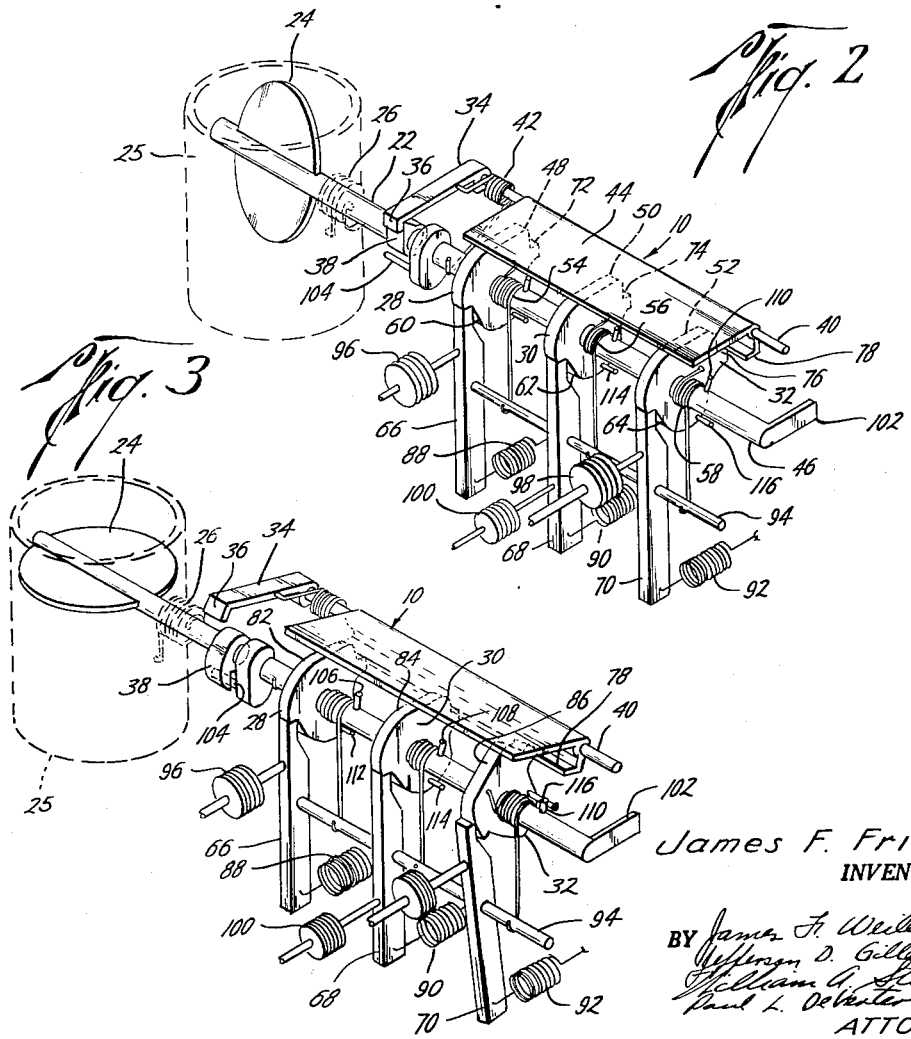
James F. Friddell
INVENTOR.

United States Patent Office 3,056,393
Patented Oct. 2, 1962

3,056,393
SAFETY SHUTDOWN APPARATUS
James F. Friddell, Houston, Tex., assignor to Stewart & Stevenson Services, Inc., Houston, Tex., a corporation of Texas
Filed Dec. 5, 1961, Ser. No. 157,116
7 Claims. (Cl. 123—41.15)

The present invention relates to an apparatus for shutting down an engine or motor, and more particularly relates to such an apparatus which will shut down the engine or a motor when undesirable operating conditions occur, such as a loss of oil pressure, overheating, or a loss in fuel pressure.

Various types of mechanisms have been used in the past to stop an engine in the event there is a loss or predetermined drop in the pressure of the engine fuel or lube oil system or will shut down the engine in the event the temperature of the coolant in the engine raises above a safe operating level. The present invention is directed to improvements in such a system.

It is an object of the present invention to provide a safety shutdown system which will monitor and shut down an engine or motor when any one of a number of operating conditions becomes abnormal.

A further object of the present invention is the provision of an improved safety shutdown apparatus which will positively and visually indicate which one of the abnormal operating conditions has caused the shutdown.

Yet a still further object of the present invention is the provision of a safety shutdown device in which any number of operating condtions of an engine or motor may be simultaneously monitored and will shut down the operation of the engine or motor upon the occurrence of any abnormal operating condition.

A still further object of the present invention is the provision of an improved safety shutdown system which includes a plurality of cams which are individually responsive to a single engine or motor operating condition and which upon the occurrence of an abnormal condition will shut down the engine or motor, indicate which condition caused the shutdown, and which may be easily and quickly reset.

Other and further objects, features and advantages will be apparent from the following description of a presently preferred embodiment of the invention, given for the purpose of disclosure, and taken in conjunction with the accompanying drawings, where like character references designate like parts throughout the several views, and where, FIGURE 1 is a prospective view illustrating the connection of the present invention in place on an operating engine, FIGURE 2 is a prospective view, omitting the housing, illustrating the present invention in position when the engine is running and all operating conditions are normal, and FIGURE 3 is a prospective view, omitting the housing, of the present invention when the safety device has been tripped so as to cause an engine shutdown.

Referring now to the drawings, the reference numeral 10 generally designates the safety shutdown device of the present invention. While the present shutdown device may be used to stop any diesel, gas, or gasoline engine in the event of an abnormal operating condition such as a loss of predetermined drop in the pressure of the engine fuel or lubricating oil or in the event of an excessive temperature of the coolant, or any other abnormal operating condition, the device will be described for convenience, and by way of example only, as shutting down a diesel engine. Furthermore, while the present shutdown device is capable of shutting down and stopping an engine or motor by shutting down the fuel or power supply, the present apparatus will be shown, as an example only, as shutting off the engine air intake to stop the engine.

The safety device 10 may be suitably enclosed in a housing box 12 which is positioned and suitably supported adjacent an engine 14 to which it is to be connected. The housing 12 includes a window 11 for purposes which will be more fully described hereinafter. Suitable lines for measuring various operating conditions of the engine such as an oil pressure line 16, a cooling water temperature line 18, and a fuel pressure line 20 are conventionally connected to the engine 14 and to the safety shutdown device 10 as will be more fully described hereinafter.

As best seen in FIGURE 2, the safety shutdown device of the present invention may be connected to any suitable type of shutdown means for stopping the engine such as being adapted to engage the latch 38 of the shaft 22 of the air intake valve 24 in the air intake line 25. A spring 26 on the intake valve shaft 22 normally acts to hold the intake valve 24 in a closed position thereby shutting off the engine air supply and stopping the engine. All of these parts are conventional and form no part of the present invention and no further description is believed necessary.

Generally, the safety shutdown apparatus 10 of the present invention includes a plurality of cams, one for each engine operating condition being monitored, here shown as three for convenience, cams 28, 30 and 32. These cams are individually controlled and actuated by one of the engine operating conditions to actuate the latching mechanism 34 which, when engaged with the engine shutdown means prevents the actuation of the shutdown means, here shown as air intake valve 24.

The latching means 34 includes a catch 36 which is normally pressed into engagement with the air intake valve latch 38 thereby interlocking and preventing the normal actuation of the air intake valve 24. The latching means 34 is suitably supported on a shaft 40 and is urged in a direction by the spring 42 to normally engage and hold the latch 36 in engagement with the air intake valve latch 38. The latching means 34 also includes a plate 44 which is secured to the shaft 40 and is positioned above and adjacent the cams 28, 30 and 32.

The cams 28, 30 and 32 are rotatably mounted upon a reset shaft 46 which will be more fully described hereinafter. Each of the cams includes a shoulder 48, 50 and 52, respectively which are normally positioned adjacent to the under side of the plate 44. Springs 54, 56 and 58 are suitably attached to the cams 28, 30 and 32, respectively, and resiliently urge the rotation of the cams about the shaft 46 thus attempting to rotate the cams to cause the shoulders 48, 50 and 52 to contact the plate 44 which in turn would cause the latching means 34 to rotate thereby releasing the shutdown air intake valve 24 and thus stop the engine.

However each of the cams includes an engaging notch and thus engaging notches 60, 62 and 64 are provided in the cams 28, 30 and 32, respectively. In addition, engaging levers 66, 68 and 70 are provided for each of the cams 28, 30 and 32, respectively. Thus, when the levers 66, 68 and 70 are positioned in the engaging notches 60, 62 and 64, each of the cams 28, 30 and 32 is prevented from any rotational movement about the shaft 46 in the direction urged by the springs 54, 56 and 58. However, should one of the engaging levers be actuated and moved out of its respective engaging notch, that particular cam will rotate and release the latching means thereby actuating the shutdown valve 24. It is also noted that each of the cams is provided with a locking notch. Thus, notches 72, 74 and 76 are provided in the cams 28, 30 and 32, respectively. The latching means 34 includes a locking flap 78 which is positioned so that when the latching means 34 is actuated and rotated upwardly the locking flap 78 will move and engage the locking notches of all of the cams that are unrotated (FIGURE 3).

In addition, the top of each of the cams is provided with a surface which is preferably visually marked such as being painted a distinctive color for visual indicating purposes. Thus, surfaces 82, 84 and 86 are provided on the cams 28, 30 and 32, respectively. Normally these surfaces 82, 84 and 86 are covered by the plate 44 when the safety device 10 is in a normal running position as shown in FIGURE 2. However, when one of the cams, such as cam 32 has been actuated (FIGURE 3) the indicating surface 86 will have been rotated so as to be visible. The visual indicating surfaces will be visible through the window 11 in the housing 12 and thus will indicate which one of the engine operating conditions caused the engine 14 to shut down.

Lever springs 88, 90 and 92 are provided to normally resiliently urge the engaging levers 66, 68 and 70, respectively in one direction. For instance, it is here noted that springs 88 and 92 urge the levers 66 and 70, which are supported on shaft 94 in a direction to become disengaged from their respective cams 28 and 32. However, the spring 90 is acting under compression against the engaging lever 68 to resiliently urge it into engagement with the cam 30. Whether the springs 88, 90 and 92 are in tension or in compression depends upon the type of lever actuating means used to measure the operating conditions of the motor so as to cause the engaging levers to become tripped.

For instance, lever 66 which may be used to measure the fuel pressure of the engine 14 and engaging lever 70 may be used to be responsive to the oil pressure of the engine 14. Thus, suitable conventional pressure bellows 96 and 98 are provided which normally exert a force against the levers 66 and 70 to maintain them in position in the engaging notches, 60 and 64, respectively so as to normally prevent the rotation of the cams 28 and 32. Lever 68 on the other hand may be made responsive to the cooling water temperature of the engine 14 and thus is controlled by a conventional temperature sensitive mechanism 100 and upon the occurrence of an excessive water temperature will press against the lower portion of the lever 68 and against the spring 90 to move the lever 68 out of engagement with and allow rotation of the cam 30.

The reset shaft 46 includes a reset lever 102 by which the reset shaft may be manually actuated. A reset pin 104 is positioned adjacent the air intake valve latch 38 so as to engage that latch (FIGURE 3) and rotate that latch 38 up into engagement with the latch 36 of the latching means 34 in order to reset the engine air intake valve 24. Additionally, reset pins 106, 108 and 110 are provided on the reset shaft 46 to engage and reset lugs 112, 114 and 116 on the cams 28, 30 and 32, respectively, in order to reset those cams which have been previously tripped.

The shafts 40, 46 and 94 are suitably journaled in and supported by the housing 12. The housing encloses and protects the other components, but by virtue of the window 11 allows the operator to observe the position of the cams in the event of an engine shutdown. Additionally, one end of the springs 88, 90 and 92 are connected to the housing 12 to provide the necessary compression or tension desired in the springs.

In operation, the safety shutdown apparatus 10 of the present invention is in running position as shown in FIGURE 2 with the latching means 34 engaging the air intake valve latch 38 thereby holding the air intake valve 24 of the engine in an open position. Also, all of the cams, 28, 30 and 32, are held in an upright position and engaged by the engaging levers 66, 68 and 70.

Thus, assuming that all of the operating conditions of the engine are satisfactory, the fuel pressure bellows 96 and oil pressure bellows 98 are exerting a force against the springs 88 and 92, respectively, to hold the engaging lever 66 and 70 into position against the cams 28 and 32, respectively. The water temperature sensitive mechanism 100 is, assuming satisfactory temperature conditions, exerting a force less than the compression force of the spring 90 so as not to actuate the temperature engaging lever 68.

Assuming that there is a loss in the oil pressure in the engine 14, the oil pressure bellows 98 will contract allowing the tension spring 92 to disengage the oil pressure level engaging lever 70 from the engaging notch 64 on the cam 32. The spring 58 then causes the cam 32 to rotate about the shaft 46. The shoulder 52 of the cam raises the plate 44 of the latching mechanism to the tripped position. When the plate 44 is rotated and raised, the locking flap 78 is moved downwardly to engage the locking notches 72 and 74 on the unactuated cams 28 and 30, respectively so as to prevent their tripping when the engine stops. Simultaneously, as the tripping plate 44 is raised, the latch 36 is raised to disengage the air intake latch 38. Thus the spring 26 on the air intake mechanism will rotate the air intake shaft 22 thereby closing the air intake valve 24 shutting off the air to the engine 14 thus stopping the engine.

It is noted that the safety shutdown apparatus 10 of the present invention is thus in the position as shown in FIGURE 3; it is particularly noted that the visual surface 86 on the cam 32 has been rotated to a position to be visible through the window 11 of the housing 12, thereby indicating which one of the cams has been actuated to indicate to the operator which abnormal operating condition exists. The operation of the water temperature or fuel pressure cams and components are similar to the loss of oil pressure as just described.

After the abnormal conditions have been corrected, the safety shutdown apparatus 10 may be quickly and easily reset manually by operation of the reset lever 102. Rotation of the lever 102 rotates the reset shaft 46 and thus the reset pin 104. The pin 104 when rotated moves the air intake latch 38 back into an upright position and into engagement with the latch 36 which is held in engagement with the air intake latch 38 by the spring 42. Thus, the air intake shaft 22 and air intake valve 24 are held open so that the engine 14 may be started. Additionally, the pins 106, 108 and 110 are rotated to engage and reset any of the cams 28, 30 and 32 which have been actuated. In the operation just described reset pin 110 engages lug 116 (FIGURE 3) to rotate cam 32 back to its original position. Of course, the reset lever 102 must be held in the reset position during the starting of the engine until the engine is running in a normal manner.

Thus it is noted that the shutdown device of the present invention shuts the engine down when any one of the operating conditions of the engine exceeds or falls below the predetermined level. It is particularly noted that any number of engine operating conditions as may be desired may be monitored merely by adding additional cams and associated elements for each operating condition desired to be monitored. The present safety shutdown system will positively indicate the cause of the shutdown by locking out and preventing the actuation of the remainder of the cams after one cam has rotated and tripped the latching mechanism. Furthermore, the visible painted portion of the cam can easily and quickly be seen through the window 11 on the cam which has been tripped so that the operator may quickly and easily note which of the operating conditions caused the engine to shut down.

The present invention, therefore, is well adapted to carry out the objects and attain the ends and advantages mentioned as well as others inherent therein. While a presently preferred embodiment of the invention is given for the purpose of disclosure, numerous changes in the details of construction, and arrangement of parts may be made which will readily suggest themselves to those skilled in the art and which are encompassed within the spirit of the invention and the scope of the appended claims.

What is claimed is:

1. In an engine safety shutdown device having shutdown means normally stopping the engine the improvement comprising, latching means engaging said shutdown means for preventing the normal actuation of said shutdown means, at least one cam means, first spring means attached to and yieldably urging the rotation of said cam means, each of said cam means including a shoulder for engaging said latching means, said shoulder positioned to move said latching means out of engagement wtih the shutdown means when the cam is rotated by said first spring means, each of said cam means having an engaging notch and a locking notch, a locking flap connected to said latching means and positioned to engage said cam locking notches of all unrotated cams when said latching means is actuated, an engaging lever for each of said cams, normally positioned to engage one of said engaging notches thereby preventing said first spring means from normally actuating said cam, a second spring means connected to and yieldably acting against said engaging lever, and actuation means actuated by one of the engine abnormal operating conditions engaging one of said levers and normally preventing the disengagement of said engaging lever from the said engaging notch.

2. The invention of claim 1 wherein said cam includes a visual indicator on said cam which normally is hidden by said latching means, but is visible when said cam is actuated.

3. The invention of claim 1 including a reset lever, said lever including means for deactuation of said shut down means, and means for resetting said cam.

4. In an engine safety shutdown device having shutdown means normally stopping the engine the improvement comprising, latching means engaging said shutdown means for preventing the normal actuation of said shutdown means, a plurality of cams, first spring means attached to and yieldably urging the rotation of said cams, each of said cams including a shoulder for engaging said latching means, said shoulders positioned to move said latching means out of engagement with the shutdown means when the cam is actuated by said first spring means, each of said cams having an engaging notch and a locking notch, a locking flap connected to said latching means and positioned to engage each of said cam locking notches of unrotated cams when said latching means is actuated, an engaging lever for each cam, said levers positioned to engage one of said engaging notches thereby preventing the rotation of said lever engaged cams, a second spring means connected to and yieldably acting to move each of said engaging levers, and actuation means actuated by one of the engine undesirable operating conditions for each cam, said actuation means engaging and normally preventing the disengagement of one of said engaging levers from its engaging notch.

5. The invention of claim 4 wherein said cam includes a visual indicator on said cam which is normally hidden from view by said latching means, but is visible when said cam is actuated.

6. The invention of claim 1 including a reset lever, said lever including means for deactuation of said shutdown means, and means for resetting all of said cams.

7. In an engine safety shutdown device having shutdown means normally stopping the engine the improvement comprising, latching means engaging said shutdown means for preventing the normal actuation of said shutdown means, a reset lever, said lever including means for deactuation of said shutdown means, two cams rotatably mounted on said reset lever, first spring means yieldably urging the rotation of said cams, means for resetting said cams connected to said reset lever, each of said cams including a visual indicator on said cam which is normally hidden from view by said latching means but is visible when said cam is actuated by said first spring means, said cams including a shoulder for engaging said latching means, said shoulder positioned to move said latching means out of engagement with the shutdown means when the cam is actuated by said first spring means, each of said cams having an engaging notch and a locking notch, a locking flap connected to said latching means and positioned to engage the cam locking notches of any unactuated cam when said latching means is actuated, an engaging lever for each cam, said levers positioned to engage one of said cam engaging notches thereby preventing the rotation of said cams, a second spring means connected to and yieldably acting to move each of said engaging levers, lever actuating means connected to each of said levers, and one of said lever actuating means being subjected to and actuated by low pressure of the lubricating oil of the engine and the other last named means being subjected to and actuated by the high temperature of the cooling medium of said engine.

No references cited.